United States Patent
Waller

(10) Patent No.: US 9,616,413 B2
(45) Date of Patent: Apr. 11, 2017

(54) CATALYST FOR PRODUCTION OF NITRIC OXIDE

(75) Inventor: David Waller, Porsgrunn (NO)

(73) Assignee: YARA INTERNATIONAL ASA, Oslo (NO)

( * ) Notice: Subject to any disclaimer, the term of this patent is extended or adjusted under 35 U.S.C. 154(b) by 825 days.

(21) Appl. No.: 12/734,312

(22) PCT Filed: Oct. 23, 2008

(86) PCT No.: PCT/NO2008/000374
§ 371 (c)(1),
(2), (4) Date: Jul. 14, 2010

(87) PCT Pub. No.: WO2009/054728
PCT Pub. Date: Apr. 30, 2009

(65) Prior Publication Data
US 2010/0278709 A1    Nov. 4, 2010

(30) Foreign Application Priority Data
Oct. 24, 2007    (NO) .................................. 20075402

(51) Int. Cl.
*B01J 23/83* (2006.01)
*B01J 23/00* (2006.01)
*C01B 21/26* (2006.01)

(52) U.S. Cl.
CPC ............ *B01J 23/83* (2013.01); *B01J 23/002* (2013.01); *C01B 21/265* (2013.01); *B01J 2523/00* (2013.01)

(58) Field of Classification Search
CPC . B01J 23/00; B01J 23/002; B01J 23/02; B01J 23/10; B01J 23/70; B01J 23/745;
(Continued)

(56) References Cited

U.S. PATENT DOCUMENTS 5,306,411 A    4/1994 Mazanec et al.
6,017,504 A    1/2000 Kaliaguine et al.
(Continued)

FOREIGN PATENT DOCUMENTS

JP    60-225643    11/1985
WO    00/03947    1/2000
(Continued)

OTHER PUBLICATIONS

Riza (NPL: Influence of A- and B-site doping on the properties of the system La2CoO4±δ), Journal of the European Ceramic Society 27 (2007) pp. 571-573.*

(Continued)

*Primary Examiner* — Melvin C Mayes
*Assistant Examiner* — Smita Patel
(74) *Attorney, Agent, or Firm* — Wenderoth, Lind & Ponack, L.L.P.

(57) ABSTRACT

The present invention provides a catalyst for production of nitric oxide from ammonia and oxygen. The catalyst has the composition $A_{((n+1)-x)}B_xC(n_{(1-y)}D_{ny}O_{(3n+1)+d}$, wherein A is a lanthanide (La, Gd, Nd, Sm) or yttrium, B is an alkaline-earth cation (Ca, Sr or Ba), C is Fe and D is Cr, Mn, Ni, Ce, Ti, Co or Mg, wherein A, B, C and D are selected independent of each other. The catalyst has a high selectivity towards nitric oxide and a low ignition temperature in the reactor. Further the present invention relates to a method for the production of gas comprising nitric oxide by the catalyst of the present invention. The produced gas has a very low content of nitrous oxide.

9 Claims, 2 Drawing Sheets

(58) Field of Classification Search
CPC ... B01J 23/75; B01J 23/76; B01J 23/78; B01J 23/83; B01J 23/84; B01J 2523/00; B01J 2523/22; B01J 2523/24; B01J 2523/72; B01J 2523/3706; B01J 2523/67; B01J 2523/842; B01J 2523/47; B01J 2523/845; B01J 2523/847; B01J 2523/3712; C01B 21/265; C01B 21/26
See application file for complete search history.

(56) References Cited

U.S. PATENT DOCUMENTS

| | | | |
|---|---|---|---|
| 6,489,264 | B1 | 12/2002 | Isupova et al. |
| 6,770,256 | B1 | 8/2004 | Kaliaguine et al. |

FOREIGN PATENT DOCUMENTS

| | | |
|---|---|---|
| WO | 2006/010904 | 2/2006 |
| WO | 2006/041300 | 4/2006 |
| WO | 2007/104403 | 9/2007 |

OTHER PUBLICATIONS

Wikipedia—definition for Ruddleson Popper.*
International Search Report issued Feb. 13, 2009 in International (PCT) Application No. PCT/NO2008/000374.
Norwegian Search Report issued May 6, 2008 in Norwegian application corresponding to present US application.
International Preliminary Report on Patentability issued Dec. 28, 2009 in International (PCT) Application No. PCT/NO2008/000374.
Sherman J. Xu et al., "Stability of $La_{0.6}Sr_{0.4}Co_{0.2}Fe_{0.8}O_{3-\delta}$ Perovskite Membranes in Reducing and Nonreducing Environments", Industrial & Engineering Chemistry Research, pp. 1290-1299, 1998.
Yue Wu et al., "A Comparative Study on Perovskite-Type Mixed Oxide Catalysts $A'_xA_{1-x}BO_{3-\lambda}$ (A'=Ca, Sr, A=La, B=Mn, Fe, Co) for $NH_3$ Oxidation", Journal of Catalysts, 120, pp. 88-107, 1989.
Javier Pérez-Ramírez et al., "Lanthanum ferrite membranes in ammonia oxidation Opportunities for pocket-sized nitric acid plants", Catalysis Today, 105, pp. 436-442, 2005.

* cited by examiner

CATALYST FOR PRODUCTION OF NITRIC OXIDE

The present invention relates to a catalyst for production of nitric oxide, its use and a method for the production of nitric oxide.

BACKGROUND

Currently, nitric acid is produced industrially via the catalytic oxidation of ammonia, over a platinum or platinum alloy-based gauze catalyst. This process, known as the Ostwald process, has essentially remained unchanged, since its inception in the first decades of the twentieth century. Ostwalds's patent was dated 1902 and when combined with Haber's development of synthesising ammonia, in 1908, the basis for the commercial production of nitric acid, which we use today, was in place.

The combustion of ammonia is carried out over a platinum-based metal or alloy catalyst in the form of a gauze or mesh or net. A number of gauzes are installed together, and they constitute the gauze pack. The upper-most gauzes have compositions optimised for the combustion of ammonia, and are referred to as the combustion gauzes. Gauzes with other compositions may be located below the combustion gauzes, and these may have other roles, as described below. The whole stack of gauzes is referred to as the gauze pack. The gauzes are produced either by weaving or knitting.

The operating temperatures of the plants are typically 850 to 930° C. and the range of pressures is from 15 bara to 1 bara. Typically, the combustion gauzes are installed in the plant for between six months and two years, depending on the plant operating conditions. Plants operating at high pressures typically have shorter campaigns than low-pressure plants.

The duration of the campaign is governed by a loss in the selectivity of the catalyst, towards the desired nitric oxide product, through the increased formation of unwanted nitrogen and nitrous oxide by-products. The loss of selectivity is related to a number of phenomena. During combustion, platinum is lost through the formation of $PtO_2$ vapour. Some of the platinum may be recovered by the installation of palladium metal-based gauzes, directly below the platinum-based combustion gauzes. The $PtO_2$ vapour alloys with the palladium, therefore, platinum is retained in the catalytically active zone. However, due to the depletion of platinum in the upper combustion zone of the gauze pack, not all of the ammonia is immediately combusted. If the ammonia is combusted in the palladium gauze region, the selectivity towards nitric oxide is reduced, and secondly, if ammonia and nitric oxide coexist in the vapour phase for a period of time, nitric oxide is reduced by ammonia, through a homogeneous reaction. This leads to both nitric oxide and ammonia losses. A final mechanism for loss of selectivity is related to the fact the platinum is lost from the combustion gauzes at a higher rate than the other alloying elements (typically rhodium). This leads to rhodium enrichment of the gauze surface which leads to selectivity loss.

Over the last sixty years, many attempts have been made to replace the expensive platinum-based combustion catalyst with lower cost catalysts, based for example on metal oxides. To date, the only commercially available oxide-based catalyst for ammonia combustion was developed by Incitec Ltd (Australia). This is based on a cobalt oxide phase. However, in terms of its selectivity of combustion of ammonia to the desired nitric oxide product, its performance is inferior to that of platinum-based systems. The cobalt oxide based systems have shown selectivity levels towards nitric oxide and nitrogen dioxide of circa 90%, in commercial units, compared to the 94 to 98% achieved with platinum-based catalysts.

Another Norwegian Patent application NO20074325 relates to another oxide catalyst composition of the formula $A_{3-x}B_xO_{9-y}$, wherein A and B independent of each other are selected from the group Mn, Co, Cr, Fe and Al, x is between 0 and 3 and y is between 0 and 5. This catalyst composition has high activity towards nitric oxide and provides high selectivity.

OBJECTIVE

One objective of the present invention is to provide a catalyst with high selectivity for production of nitric oxide through oxidation of ammonia.

Another objective is to provide an active catalyst for production of nitric oxide.

Another objective is to provide an improved catalyst which overcomes some of the disadvantages mentioned above.

The objectives of the invention may be obtained by the features as set forth in the following description of the invention and/or in the appended patent claims.

DESCRIPTION OF THE INVENTION

The present invention provides a catalyst for ammonia oxidation based on low-cost oxide systems.

The general formula for the catalysts is $A_{((n+1)-x)}B_x C_{(n(1-y))}D_{ny}O_{(3n+1)+d}$, where A is a lanthanide (La, Gd, Nd, Sm) or yttrium, B is an alkaline-earth cation (Ca, Sr or Ba), C is Fe and D is Cr, Mn, Ni, Ce, Ti, Co or Mg, wherein A, B, C and D are selected independent of each other, n is larger than 0, x is between 0 and 1, y is between 0 and 1 and d is between −1 and +1.

The number d in the formula of the present catalyst is dependant on the numbers of the other metal ions. In the case of the $La_2FeO_4$ structure, the Fe has a nominal charge of 2+. However, if 25% of the Fe is in a 3+ state, extra negative charge is needed, such that d=0.25 which gives the formula $La_2FeO_{4.25}$. If 25% of the Fe is in an 1+ state, the charge is too negative in the structure and d=−0.25 such that the formula is $La_2FeO_{3.75}$. It is characteristic for these oxides that the metal oxidation state can change with both temperature and the oxygen concentration. Under operating conditions the exact oxidation state of each element cannot be established.

The general formula for the catalysts is $A_{((n+1)-x)}B_x C_{(n(1-y))}D_{ny}O_{(3n+1)+d}$, wherein n>0 or n is 1 to 5 or n is 1 to 3 or n is 1 to 2 or n=1, and x is between 0 and 1 and the value of y is between 0 and 1. The structure-type of these oxides, for n>0, can be referred to as Ruddleson-Popper phases.

Examples for formulas of the catalyst of the present invention with its limits for x and y are shown in table 1, wherein A is La and B is Sr.

TABLE 1

Examples for catalyst formulations

| Base system | Upper limit of x | Lower limit of x | Upper limit of y | Lower limit of y |
|---|---|---|---|---|
| $La_{((n+1)-x)}Sr_xFe_{(n(1-y))}Co_{ny}O_{(3n+1)d}$ | 0.75 | 0 | 0.75 | 0 |
| $La_{((n+1)-x)}Sr_xFe_{(n(1-y))}Mn_{ny}O_{(3n+1)d}$ | 0.75 | 0 | 0.75 | 0 |

TABLE 1-continued

Examples for catalyst formulations

| Base system | Upper limit of x | Lower limit of x | Upper limit of y | Lower limit of y |
|---|---|---|---|---|
| $La_{((n+1)-x)}Sr_xFe_{(n(1-y))}Cr_{ny}O_{(3n+1)d}$ | 0.75 | 0 | 0.75 | 0 |
| $La_{((n+1)-x)}Sr_xFe_{(n(1-y))}Ni_{ny}O_{(3n+1)d}$ | 0.75 | 0 | 0.75 | 0 |
| $La_{((n+1)-x)}Sr_xFe_{(n(1-y))}Mg_{ny}O_{(3n+1)d}$ | 0.75 | 0 | 0.75 | 0 |
| $La_{((n+1)-x)}Sr_xFe_{(n(1-y))}Ti_{ny}O_{(3n+1)d}$ | 0.75 | 0 | 0.75 | 0 |
| $La_{((n+1)-x)}Sr_xFe_{(n(1-y))}Ce_{ny}O_{(3n+1)d}$ | 0.75 | 0 | 0.75 | 0 |

Without limiting the scope of the present invention, there can be mentioned the preferred catalysts with the formula $LaSrFe_{0.75}Co_{0.25}O_{4+d}$ or $LaSrFe_{0.5}Co_{0.5}O_{4+d}$ or $La_{1.5}Sr_{0.5}Fe_{0.5}Co_{0.5}O_{4+d}$.

The catalysts may be prepared by coprecipitation, complexation, combustion synthesis, freeze-drying or solid-state routes, or by other state-of-the-art methods of producing mixed-metal oxides.

Further the present invention provides a method for the production of a gas comprising nitric oxide wherein a gas blend, which comprises ammonia and oxygen, is converted in presence of a catalyst according to the present invention.

The method of the present invention comprises the following steps (a) continuously feeding the gas blend comprising ammonia and oxygen to a reactor which comprises the catalyst of the present invention, whereby the temperature of the feed $T_{a1}$ is increased until ignition of the reaction at temperature $T_b$, (b) thereafter adjusting the temperature of the feed $T_{a2}$ to achieve a defined temperature in the reactor $T_c$. The reactor may be an atmospheric pressure reactor with a catalyst bed. The temperature of the feed $T_{a1}$ may be increased with a rate of 2 to 10°/min or 3 to 6°/min or 5°/min for example by increasing the temperature of the feedstock pre-heater.

Under heating, the fed gases will ignite at the ignition temperature $T_b$. Ignition results in a temperature increase in the reactor. $T_b$ is defined as an increase in temperature in the catalyst bed (measured with a thermocouple placed in the catalyst bed) at a rate exceeding 20°/second. The ignition temperature indicates that the catalyst is active towards ammonia oxidation and is therefore sought to be as low as possible. Further, a high ignition temperature could hinder the catalyst from being used in commercial reactors most commonly used today. The ignition temperature $T_b$ of the method of the present invention is in the range of 330 to 450° C. or 330 to 390° C. or 330 to 370° C.

After ignition in step (b) the temperature of the feed $T_{a2}$ is adjusted to achieve a defined temperature in the reactor $T_c$. Often, the adjustment is a decrease of the feed temperature, if the ignition temperature $T_b$ is high, which may prevent a overheating in the reactor due to ignition. The adjustment may be done by reducing the temperature of the feedstock pre-heater. $T_c$ may be in the range of 800-950° C. or 800-900° C. or 800-850° C. The temperature $T_c$ may be a series of defined temperatures. For example $T_c$ may be composed of $T_{c1}$, $T_{c2}$ and $T_{c3}$, whereby for example of $T_{c1}=800°$ C., $T_{c2}=850°$ C. and $T_{c3}=900°$ C. $T_c$ may have values higher or lower than the aforementioned temperatures, depending on the design of the reactor.

The selectivity of a catalyst can be determined by using the $N_2O$ concentration from infrared measurements and nitrogen concentrations from mass spectroscopic measurements. By measuring the concentrations of these two undesired by-products, the concentration of the desired nitric oxide and additional nitrogen dioxide may be calculated. In the method of the present invention the selectivity of the conversion towards nitric oxide and nitrogen dioxide was measured accordingly and found to be 90 to 96% or 92 to 96% or 94 to 96% or 95 to 96%.

The gases produced by the method of the present invention have a low concentration of nitrous oxide compared to conventional platinum-based combustion catalysts which often are in the range of 1000-4000 ppm. The concentration of nitrous oxide in gases catalysed by the catalyst of the present invention is lower than 100 ppm or lower than 80 ppm or lower than 60 ppm or lower than 40 ppm or lower than 20 ppm or lower than 10 ppm.

The present invention relates further to the use of a catalyst according to the present invention for conversion of a gas blend, which is comprised of ammonia and oxygen, to nitric oxide.

The catalysts of the present invention are shown to have a very high selectivity, up to 95%. Further the catalyst has a high activity towards production of nitric oxide. Since the catalysts of the present invention consist of low cost oxides, it may replace the expensive platinum based catalyst systems in use today.

Further, the invention provides oxide catalysts from several elements and thereby gives many possibilities to produce different compositions. Thereby the present invention provides a concept to design catalysts for production of nitric oxide where the elements can be chosen e.g. according to considerations of costs and availability of elements. Since the different compositions will result in variations of their functional properties, their choice may be optimized to fit to the selected plant.

The range of the ignition temperatures in processes catalysed by the catalysts of the present invention is relatively narrow and thereby different catalyst compositions might replaced each other in processes without the need for extensive modifications of the process conditions.

Further, the catalyst of the present invention can be used in methods of the art, as in fluidized bed reactors and is easily installed in existing processing equipment. The method of the present invention results in a cleaner nitric oxide since the level of undesired nitrous oxide is very low and contents of only 5 ppm nitrous oxide have been measured. The high selectivity increases the efficiency of the method and reduces the need for further purification. Thereby the nitric oxide may find new application areas where very pure nitric oxide at low cost is demanded.

EXAMPLES

Example 1

The catalysts were tested in an atmospheric pressure reactor, with an internal diameter of 8 mm. The catalyst bed (0.15 cm³), consisting of catalyst granules in the size range of 0.2 to 0.5 mm, was supported on a quartz frit. The gas feedstock, consisting of 10 volume % ammonia in air or 20% oxygen/80% argon was passed through the catalyst bed, at a rate of 3 N.1/min, and the product gas was analysed using infrared spectroscopy and mass spectrometry. The experimental procedure involved increasing the temperature of the gas feedstock at a rate of 5°/min until the catalyst initiated combustion, defined as an increase in temperature in the catalyst bed (measured with a thermocouple placed in the catalyst bed) at a rate exceeding 20°/second. After ignition, the temperature of the gas feedstock was adjusted to give a catalyst bed temperature of 900° C.

The ignition temperatures towards formation of NO and $NO_2$, of the catalysts described in Table 1, are shown in Table 2.

TABLE 2

Ignition temperature (° C.) for $La_{((n+1)-x)}Sr_xFe_{(n(1-y))}Co_{ny}O_{(3n+1)+d}$, where n = 1

| | x | | |
|---|---|---|---|
| y | 0 | 0.5 | 1.0 |
| 0 | | | 416 |
| 0.25 | 354 | 428 | 395 |
| 0.5 | 388 | 415 | 376 |
| 0.75 | 383 | 377 | 349 |

Table 3 shows concentrations of nitrous oxide achieved for the gases catalyst of the catalysts of the present invention.

TABLE 3

$N_2O$ level for $La_{((n+1)-x)}Sr_xFe_{(n(1-y))}Co_{ny}O_{(3n+1)+d}$, where n = 1

| | x | | |
|---|---|---|---|
| y | 0 | 0.5 | 1.0 |
| 0 | | | 5 |
| 0.25 | 14 | 3 | 0 |
| 0.5 | 21 | 0 | 0 |
| 0.75 | 7 | 0 | 0 |

The selectivity towards formation of NO and $NO_2$ of the catalysts described in table 1, are shown in table 4.

TABLE 4

Selectivity towards NO + $NO_2$ for $La_{((n+1)-x)}Sr_xFe_{(n(1-y))}Co_{ny}O_{(3n+1)+d}$, where n = 1

| | X | | |
|---|---|---|---|
| y | 0 | 0.5 | 1.0 |
| 0 | | | 90.3 |
| 0.25 | 91.7 | 90.5 | 94.6 |
| 0.5 | 90.3 | 93.0 | 93.8 |
| 0.75 | 93.2 | 92.2 | 93.0 |

Example 2

An oxide with the composition $LaSrFe_{0.75}Co_{0.25}O_{4+d}$ was prepared by complexation. 1 molar $La(NO_3)_3 \cdot 6H_2O$, $Sr(NO_3)_2$, $Fe(NO_3)_3 \cdot 9H_2O$ and $Co(NO_3)_2 \cdot 6H_2O$ solutions were mixed in 1:1:0.75:0.25 volume ratios. To 100 ml of the mixed-metal nitrate solution was added 25 ml of 64% $HNO_3$, 100 ml of ethylene glycol and 211 g of citric acid. The resulting solution was heated to 150° C. with stirring until a highly viscous liquid/gel was obtained. The gel was heated in a muffle oven at 400° C. for 12 hours. The resulting solid was ground and calcined in a muffle oven at 900° C. for 12 hours.

XRD analysis confirmed that this material was a single phase, mixed-oxide with the composition $La_{((n+1)-x)}Sr_xFe_{(n(1-y))}Co_{ny}O_{4+d}$, where (n=1, x=1 and y=0.25) i.e. $LaSrFe_{0.75}Co_{0.25}O_{4+d}$ where d is between 0.5 and 0.

Figure 1:
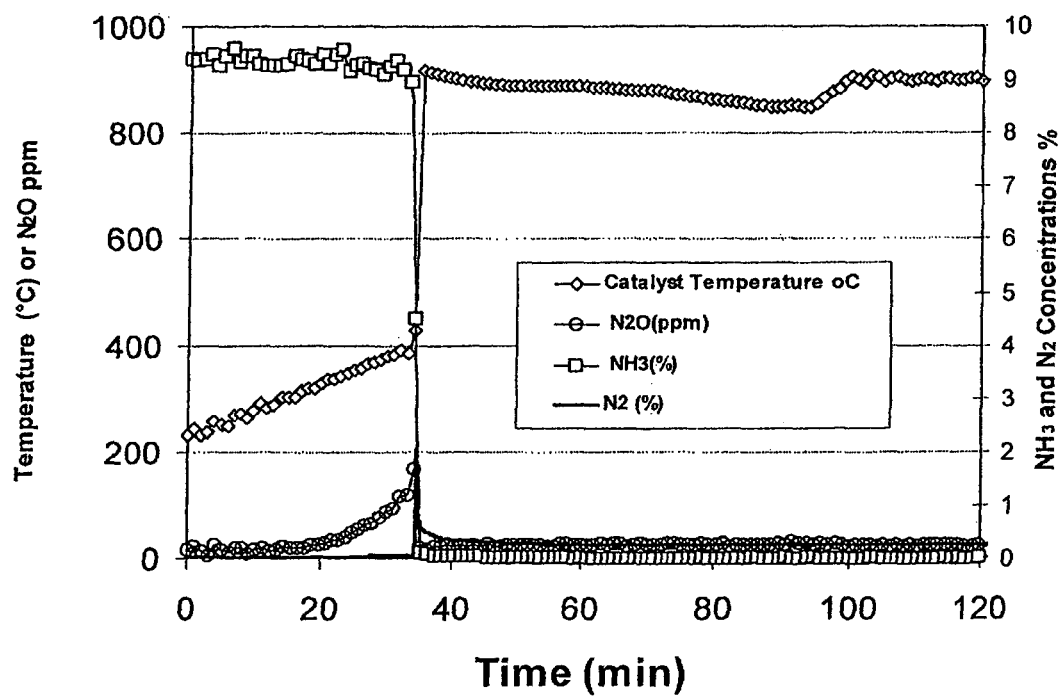
FIG. 1 shows the experimental properties of $LaSrFe_{0.75}Co_{0.25}O_{4+d}$, which is one embodiment of the catalyst of the present invention.

The calcined catalyst was pressed into pellets which were crushed to produce a sieve fraction between 0.2 and 0.5 mm. These granules (0.2778 g) were loaded into the ammonia oxidation reactor, and were subjected to a test procedure described above. The temperature in the catalyst bed, concentrations of $NH_3$, $N_2$ and $N_2O$ are shown in FIG. 1. The catalyst bed temperature reaches 900° C. at time=100 minutes.

It is observed that the catalyst ignites when the temperature of the oxygen-ammonia-argon gas feed reaches 395° C. After ignition, the ammonia level is observed to fall to zero %, indicating full combustion of the ammonia. The $N_2O$ levels are significantly reduced when compared to conventional platinum-based catalysts, in which $N_2O$ emissions are typically in the range of 1000 to 4000 ppm, depending on combustion conditions.

Figure 2:
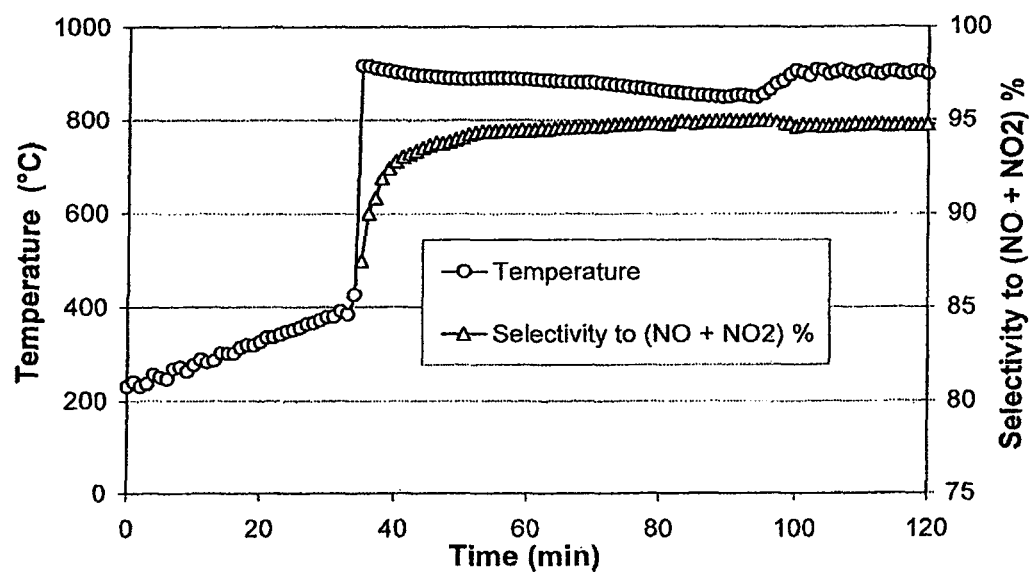
FIG. 2 shows the selectivity calculated from FIG. 1 along with the catalyst bed temperature.

From FIG. 2, we observe that a selectivity of $LaSrFe_{0.75}Co_{0.25}O_{3+d}$ towards $NO+NO_2$ is circa 95%, at 900° C.

The invention claimed is:

1. A method for the production of a gas comprising nitric oxide,
   which comprises converting a gas blend comprising ammonia and oxygen in the presence of a catalyst comprising the composition $A_{((n+1)-x)}B_xC_{(n(1-y))}D_{ny}O_{(3n+1)+d}$, to obtain the gas comprising nitric oxide,
   wherein:
   A is a lanthanide (La, Gd, Nd, or Sm) or yttrium,
   B is an alkaline-earth cation (Ca, Sr or Ba),
   C is Fe,
   D is Cr, Mn, Ni, Ce, Ti, Co or Mg,
   n is 5>n≥1,
   x is 1>x>0,
   y is 1>y>0, and
   d is 1>d>−1.
2. The method according to claim 1,
   which comprises the steps of
   (a) continuously feeding said gas blend to a reactor comprising said catalyst, wherein a temperature of the feed before ignition, $T_{a1}$, is increased until ignition of the reaction at temperature $T_b$, and
   (b) thereafter adjusting a temperature of the feed after ignition, $T_{a2}$, to achieve a defined temperature in the reactor, $T_c$, during the reaction.
3. The method according to claim 2,
   wherein the ignition temperature $T_b$ of said gas blend is 330 to 450° C.
4. The method according to claim 1, wherein A is La and B is Sr.
5. The method according to claim 1, wherein n is 3>n≥1.
6. The method according to claim 5, wherein n is 2>n≥1.
7. The method according to claim 5, wherein n=1.
8. The method according to claim 3, wherein the temperature $T_b$ is 330 to 390° C.
9. The method according to claim 3, wherein the temperature $T_b$ is 330 to 370° C.

* * * * *